Patented Jan. 21, 1941

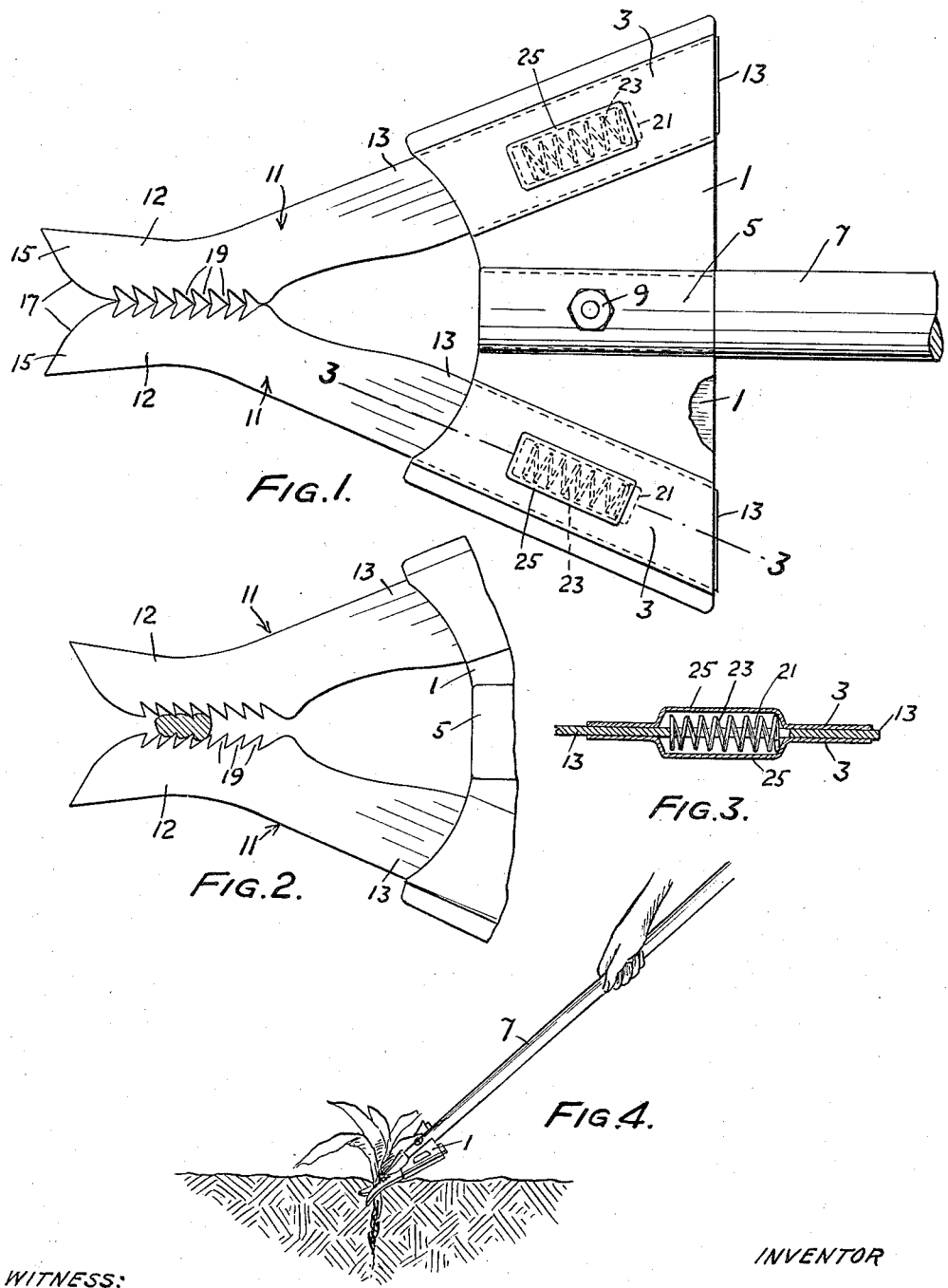

2,229,434

UNITED STATES PATENT OFFICE 2,229,434

WEEDING DEVICE

Alfred J. Bailie, Wyndmoor, Pa.

Application December 18, 1939, Serial No. 309,757

6 Claims. (Cl. 294—50.8)

This invention relates to an improved weeding device, adapted to be conveniently manipulated to effectively grasp and remove weeds, including the roots, from the soil.

Heretofore it has been proposed to use many types of weeding devices for this purpose. However, these prior devices have all suffered from one or more defects in operation. Thus various of them would only cut the weed close to the soil surface, leaving much of the root in the ground, others could be manipulated only with difficulty and required the use of both hands, and still others would not grasp the weed sufficiently firmly to remove it from the ground.

Now in accordance with this invention I have provided an improved weeding device which may easily be manipulated with one hand and is effective to grasp firmly and unyielding the weed, without cutting the same, and so remove it from the soil.

In the accompanying drawing I have illustrated a preferred embodiment of my invention. In this drawing:

Fig. 1 is a detail plan view of the operative head of my improved weeding device, shown in closed position;

Fig. 2 is a fragmentary detail view showing the position of the blades when the device is grasping the root or stem of a weed;

Fig. 3 is a sectional view on the line 3—3 in Fig. 1; and

Fig. 4 is a perspective view showing the weeding device in use.

In my improved form of weeding device, as shown in the drawing, a pair of plates 1 preferably formed of or coated with a non-tarnishing metal or alloy, dished as illustrated to provide, when assembled, a pair of forwardly converging guide channels 3 and a central, handle-receiving collar 5, are secured together, as by spot-welding or riveting, to form an assembly which is mounted at the lower end of a handle 7, ordinarily formed of wood, and held in place by a bolt 9.

A pair of blades 11, which, as assembled, are mirror images of each other, have shanks 13 extending within the guide channels 3 and retained there by means hereinafter described. The blades 11 are formed with relatively blunt nose portions 15 having curved surfaces 17 leading inwardly and rearwardly, and acting as cams to force the blades rearwardly when the instrument is thrust into the soil. So that the surfaces 17 may act in this manner the blades 11 are of sufficient thickness to afford considerable resistance when thrust into the ground.

The forward portions 12 of the blades 11 are parallel with each other when the blades are in assembled position, and are provided, along their inner or adjacent faces with a plurality of rearwardly directed teeth 19 for grasping and retaining the stems or roots of weeds. The shanks 13 of the blades 11 diverge from the forward portions 12 at an angle, as shown in Figure 1, so as to be received in the guide channels 3, which they fit closely, so that the blades 11 are held rigidly against lateral motion but are free to slide within the channels. The jaws 12 thus are free to move in paths which intersect at a point below the handle.

As best shown in Fig. 3, a slot 21 is formed centrally of each shank 13 in which a coil spring 23 is positioned and held in place by the housings 25 formed centrally of guide channels 3 by the stamping operation in which they were formed in plates 1. The blades 11 are thus spring pressed to the position shown in Fig. 1, in which their forward portions 12 meet, but may independently be forced rearwardly against the action of springs 23. When forced rearwardly the forward portions 12 of the blades separate, as shown in Fig. 2, and will receive a weed root between them.

In operation, the device is held approximately in the position shown in Fig. 4 and is pushed into the ground closely adjacent the weed and at an angle that will cause the blades to reach the root of the weed below the surface of the soil. The soil, resisting the entrance of the blades 11, causes them to slide rearwardly within the guide channels 3 against the action of the springs 23. This motion separates the forward portions 12 of the blades, and the root of the weed, guided by the surfaces 17, enters between the blades, as shown in Fig. 2.

The downward force which has up to now been exerted on the device by the operator is now relaxed and the springs 23 at once force the blades 11 forwardly in a converging direction. This motion causes the forward portions 12 of the blades to approach each other and thus firmly grasp the weed root. The weeding device is then withdrawn by the operator together with the weed, which is pulled up by the roots. In this withdrawal the weed root is engaged by the teeth 19 and the greater the resistance offered by the weed, the more strongly the forward portions 12 of the blades are forced together.

The device is then ready for use to remove other weeds, and in such operation will desirably be turned over so that the leaves and foliage of the weed just removed will be directed downwardly, whereupon, as the forward portions 12 of the blades move apart under the downward thrust of the weeder into the soil, the weed previously removed will fall out. However, if this, for any reason, does not happen, the weed first removed will be forced step by step rearwardly between the forward portions 12 until it reaches the open space between the blades 11, where it will be released and fall from the device. It accordingly is not necessary to stop and clear the device during use, although, if desired, when stopping work on any particular occasion, the device may easily be cleared by placing the blades on, for example, any rounded surface and pressing down the handle, or by simply thrusting it into the ground.

It will be understood that the details of construction hereinbefore described are illustrative only and may be modified in many particulars without departing from the scope of my invention, which is defined by the claims hereinafter set forth.

What I claim and desire to protect by Letters Patent is:

1. In a weed puller, the combination of opposed jaw elements having root-engaging portions adapted to be inserted in the ground for gripping a root to be removed from the ground, a handle, and means connecting said jaw elements with said handle in such manner that they are, respectively, movable in paths intersecting at a point below the handle, whereby when said root-engaging portions are thrust into the ground the jaw elements move divergingly along said paths and the said root-engaging portions thereof are thereby separated, while upon upward movement of the handle the jaw elements move convergingly along said paths and the root-engaging portions thereof are forced together.

2. In a weed puller, the combination of opposed jaw elements having root-engaging portions adapted to be inserted in the ground for gripping a root to be removed from the ground, a handle, means connecting said jaw elements with said handle in such manner that they are, respectively, movable in paths intersecting at a point below the handle, and means urging said jaw elements along said paths in a converging direction, whereby when said root-engaging portions are thrust into the ground the jaw elements move divergingly along said paths and the said root-engaging portions thereof are thereby separated, while upon upward movement of the handle the jaw elements move convergingly along said paths and the root-engaging portions thereof are forced together.

3. A weed puller as claimed in claim 1, wherein the means connecting the jaw elements with the handle include a plurality of angularly disposed guide channels in which said jaw elements are respectively slidable.

4. In a weed puller, the combination of a pair of opposed jaw elements having root-engaging portions adapted to be inserted in the ground for gripping a root to be removed from the ground, a handle, means connecting said jaw elements with said handle including a pair of guide channels in which said jaw elements are, respectively, slidable, said channels being angularly disposed so that the jaw elements move in paths intersecting at a point below the handle, and means limiting the movement of said jaw elements within said channel, whereby when said root-engaging portions are thrust into the ground the jaw elements move divergingly along said paths and the said root-engaging portions thereof are thereby separated, while upon upward movement of the handle the jaw elements move convergingly along said paths and the root-engaging portions thereof are forced together.

5. In a weed puller, the combination of a pair of opposed jaw elements having root-engaging portions adapted to be inserted in the ground for gripping a root to be removed from the ground, a handle, means connecting said jaw elements with said handle including a pair of guide channels in which said jaw elements are, respectively, slidable, said channels being angularly disposed so that the jaw elements move in paths intersecting at a point below the handle, and means limiting the movement of said jaw elements within said channel and urging them downwardly therein, whereby when said root-engaging portions are thrust into the ground the jaw elements move divergingly along said paths and the said root-engaging portions thereof are thereby separated, while upon upward movement of the handle the jaw elements move convergingly along said paths and the root-engaging portions thereof are forced together.

6. In a weed puller, the combination of a pair of opposed jaw elements having root-engaging portions adapted to be inserted in the ground for gripping a root to be removed from the ground, a handle, means connecting said jaw elements with said handle including a pair of guide channels in which said jaw elements are, respectively, slidable, said channels being angularly disposed so that the jaw elements move in paths intersecting at a point below the handle, and said jaw elements each having a slot formed in that portion thereof normally lying within said channel, a housing formed by dishing out a portion of the channel walls, and a compressible spring retained in said housing and lying within said slot, whereby when said root-engaging portions are thrust into the ground the jaw elements move divergingly along said paths and the said root-engaging portions thereof are thereby separated, while upon upward movement of the handle the jaw elements move convergingly along said paths and the root-engaging portions thereof are forced together.

ALFRED J. BAILIE.